United States Patent
Makimizu et al.

(10) Patent No.: US 10,138,530 B2
(45) Date of Patent: Nov. 27, 2018

(54) METHOD FOR PRODUCING HIGH-STRENGTH GALVANNEALED STEEL SHEETS

(71) Applicant: JFE STEEL CORPORATION, Tokyo (JP)

(72) Inventors: Yoichi Makimizu, Fukuyama (JP); Yoshitsugu Suzuki, Fukuyama (JP); Mai Aoyama, Fukuyama (JP); Hiroshi Hasegawa, Fukuyama (JP); Gentaro Takeda, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 324 days.

(21) Appl. No.: 15/103,495

(22) PCT Filed: Dec. 11, 2014

(86) PCT No.: PCT/JP2014/006177
§ 371 (c)(1),
(2) Date: Jun. 10, 2016

(87) PCT Pub. No.: WO2015/087549
PCT Pub. Date: Jun. 18, 2015

(65) Prior Publication Data
US 2016/0304982 A1    Oct. 20, 2016

(30) Foreign Application Priority Data
Dec. 13, 2013 (JP) .................. 2013-257569

(51) Int. Cl.
C21D 9/46    (2006.01)
C21D 1/74    (2006.01)
(Continued)

(52) U.S. Cl.
CPC .................. *C21D 9/46* (2013.01); *C21D 1/26* (2013.01); *C21D 1/74* (2013.01); *C22C 18/04* (2013.01);
(Continued)

(58) Field of Classification Search
None
See application file for complete search history.

(56) References Cited

U.S. PATENT DOCUMENTS

| | | | |
|---|---|---|---|
| 2010/0304183 A1 | 12/2010 | Honda et al. | |
| 2013/0273251 A1 | 10/2013 | Takahashi et al. | |
| 2014/0174608 A1 | 6/2014 | Miyata et al. | |

FOREIGN PATENT DOCUMENTS

| | | |
|---|---|---|
| EP | 2719790 A1 | 4/2014 |
| EP | 2840161 A1 | 2/2015 |

(Continued)

OTHER PUBLICATIONS

Dec. 23, 2016 Search Report issued in European Patent Application No. 14870378.8.

(Continued)

*Primary Examiner* — Deborah Yee
(74) *Attorney, Agent, or Firm* — Oliff PLC

(57) ABSTRACT

A method for producing high-strength galvannealed steel sheets having excellent workability and fatigue resistance. The method comprises subjecting a steel sheet to an oxidation treatment, the oxidation treatment including heating the steel sheet in an upstream stage at a temperature in the range of 400° C. to 750° C. in an atmosphere having an $O_2$ concentration of not less than 1000 ppm by volume and a $H_2O$ concentration of not less than 1000 ppm by volume and a downstream stage at a temperature in the range of 600° C. to 850° C. in an atmosphere having an $O_2$ concentration of less than 1000 ppm by volume and a $H_2O$ concentration of (Continued)

not less than 1000 ppm by volume. The method further comprises subjecting the steel sheet to reducing annealing, hot-dip galvanizing treatment and alloying treatment.

9 Claims, 2 Drawing Sheets

(51) Int. Cl.
    *C21D 1/26*     (2006.01)
    *C23C 2/02*     (2006.01)
    *C23C 2/06*     (2006.01)
    *C23C 2/28*     (2006.01)
    *C23C 2/40*     (2006.01)
    *C23C 8/14*     (2006.01)
    *C23C 8/80*     (2006.01)
    *C23C 8/04*     (2006.01)
    *C22C 18/04*     (2006.01)
    *C22C 38/00*     (2006.01)
    *C22C 38/04*     (2006.01)
    *C22C 38/58*     (2006.01)
    *C22C 38/02*     (2006.01)
    *C21D 8/04*     (2006.01)

(52) U.S. Cl.
    CPC ............ *C22C 38/00* (2013.01); *C22C 38/002* (2013.01); *C22C 38/02* (2013.01); *C22C 38/04* (2013.01); *C22C 38/58* (2013.01); *C23C 2/02* (2013.01); *C23C 2/06* (2013.01); *C23C 2/28* (2013.01); *C23C 2/40* (2013.01); *C23C 8/14* (2013.01); *C23C 8/80* (2013.01); *C21D 8/04* (2013.01)

(56) References Cited

FOREIGN PATENT DOCUMENTS

| | | |
|---|---|---|
| JP | S55-122865 A | 9/1980 |
| JP | H04-202630 A | 7/1992 |
| JP | H04-202631 A | 7/1992 |
| JP | H04-202632 A | 7/1992 |
| JP | H04-202633 A | 7/1992 |
| JP | H04-254531 A | 9/1992 |
| JP | H04-254532 A | 9/1992 |
| JP | H07-34210 A | 2/1995 |
| JP | 2004-211157 A | 7/2004 |
| JP | 2005-060742 A | 3/2005 |
| JP | 2007-291498 A | 11/2007 |
| JP | 2012-126983 A | 7/2012 |
| JP | 2012-177147 A | 9/2012 |
| JP | 2012-251192 A | 12/2012 |
| WO | 2012/169653 A1 | 12/2012 |
| WO | 2013/157146 A1 | 10/2013 |

OTHER PUBLICATIONS

Mar. 3, 2017 Office Action issued in Korean Patent Application No. 10-2016-7012375.
Jul. 3, 2017 Office Action issued in Chinese Patent Application No. 201480067807.5.
Jul. 19, 2016 Office Action issued in Japanese Patent Application No. 2014-251415.
Mar. 10, 2015 Search Report issued in International Application No. PCT/JP2014/006177.

H₂O CONCENTRATION: 300 ppm

H₂O CONCENTRATION: 1500 ppm

METHOD FOR PRODUCING HIGH-STRENGTH GALVANNEALED STEEL SHEETS

TECHNICAL FIELD

This application relates to a method for producing high-strength galvannealed steel sheets with excellent workability and fatigue resistance using Si-containing high-strength steel sheets as base steel.

BACKGROUND

In recent years, steel sheets on the surface of which rustproof treatments are performed, in particular, galvanized steel sheets and galvannealed steel sheets which exhibit excellent rust-proofness, are used in such fields as automobiles, home appliances and building materials. On the other hand, from the point of view of enhancing the fuel efficiency of automobiles and the safety of automobiles in the event of crash, lightweight and strong bodies are pursued by increasing the strength of body materials and thereby allowing the thickness to be decreased. For this purpose, high-strength steel sheets are increasingly applied to automobiles.

In general, in production of galvanized steel sheets, thin steel sheets which are obtained by hot-rolling a steel slab or by further performing cold-rolling are used as base steel and the base steel sheets are subjected to recrystallization annealing in an annealing furnace on a CGL and thereafter hot galvanizing treatment. In the case of galvannealed steel sheets, the hot galvanization is followed by alloying treatment.

The addition of silicon and manganese is effective for increasing the strength of steel sheets. However, silicon and manganese are oxidized during continuous annealing even in a reductive $N_2+H_2$ gas atmosphere which does not cause the oxidation of iron (which reduces iron oxides), forming oxides of silicon and manganese on the outermost surface of the steel sheets. Such oxides of silicon and manganese cause a decrease in the wettability of the base steel sheets with respect to molten zinc during the coating treatment. Consequently, steel sheets containing silicon and/or manganese frequently suffer bare spots or, if not bare spots, poor coating adhesion.

Patent Literature 1 discloses a method in which galvanized steel sheets are produced using high-strength steel sheets that contain large amounts of silicon and manganese, as base steel. In the disclosed method, reducing annealing is performed after an oxide film is formed on the surface of the steel sheets. However, good coating adhesion cannot be obtained stably by the method of Patent Literature 1.

To solve this problem, Patent Literatures 2 to 8 disclose techniques directed to obtaining stable effects by specifying the oxidation rate or the amount of reduction, or by actually measuring the thickness of oxide films formed in the oxidation zone and then controlling the oxidation conditions or the reduction conditions based on the measurement results.

In Patent Literatures 9 to 11, the composition of gases such as $O_2$, $H_2$ and $H_2O$ in the atmosphere during the oxidation-reduction step is specified.

CITATION LIST

Patent Literature

PTL 1: Japanese Unexamined Patent Application Publication No. 55-122865
PTL 2: Japanese Unexamined Patent Application Publication No. 4-202630
PTL 3: Japanese Unexamined Patent Application Publication No. 4-202631
PTL 4: Japanese Unexamined Patent Application Publication No. 4-202632
PTL 5: Japanese Unexamined Patent Application Publication No. 4-202633
PTL 6: Japanese Unexamined Patent Application Publication No. 4-254531
PTL 7: Japanese Unexamined Patent Application Publication No. 4-254532
PTL 8: Japanese Unexamined Patent Application Publication No. 7-34210
PTL 9: Japanese Unexamined Patent Application Publication No. 2004-211157
PTL 10: Japanese Unexamined Patent Application Publication No. 2005-60742
PTL 11: Japanese Unexamined Patent Application Publication No. 2007-291498

SUMMARY

Technical Problem

It has been found that the methods of producing galvanized steel sheets disclosed in Patent Literatures 1 to 8 cannot always provide sufficient coating adhesion due to oxides of silicon and manganese being formed on the surface of steel sheets during continuous annealing.

While the production methods described in Patent Literatures 9 and 10 realize an improvement in coating adhesion, oxide scales formed by the excessive oxidation in the oxidation zone are picked up by the rolls in the furnace and become attached thereto to cause the occurrence of dents in steel sheets. This is so called "pick-up phenomenon" which causes a problem.

While the production method described in Patent Literature 11 is effective for suppressing the pick-up phenomenon, it has been found that good workability and high fatigue resistance cannot always be obtained.

The disclosed embodiments have been made in view of the circumstances described hereinabove. It is therefore an object of the disclosed embodiments to provide a method for producing high-strength galvannealed steel sheets having excellent workability and fatigue resistance.

Solution to Problem

As mentioned above, the addition of solid solution strengthening elements such as silicon and manganese is effective for increasing the strength of steel. In high-strength steel sheets used in automobile applications, the steel sheets are press formed, and therefore an enhancement in the balance between strength and ductility is required. In this respect, Si-containing steel is very useful as high-strength steel sheets because silicon advantageously increases the strength of steel without causing a decrease in ductility. However, the following problems are encountered in the manufacturing of high-strength galvannealed steel sheets using Si-containing steel as the base steel.

In the annealing atmosphere, silicon forms silicon oxides on the outermost surface of steel sheets to cause a decrease in the wettability of the steel sheets with respect to molten zinc. In the Si-containing steel, further, the reaction between iron and zinc during the alloying treatment after the hot-dip galvanizing treatment is suppressed. To allow the metals to be alloyed normally, it is necessary that the alloying treatment be performed at a relatively high temperature. However, sufficient workability cannot be obtained if the alloying treatment is performed at a high temperature.

The alloying treatment performed at a high temperature results in a failure of obtaining sufficient workability. The reason for this failure of obtaining sufficient workability has been found to be because the retained austenite phase in steel that is necessary for ensuring ductility is decomposed into pearlite phase. It has been further found that when the hot-dip galvanizing treatment and the alloying treatment are preceded by cooling of the steel sheet to or below the Ms point and reheating of the steel sheet, sufficient strength cannot be obtained due to the tempering of the martensite phase responsible for the strength. As discussed hereinabove, Si-containing steel involves the problem that the alloying temperature is high and consequently desired mechanical characteristic values cannot be obtained.

To prevent the oxidation of silicon on the outermost surface of steel sheets, it is effective to perform reducing annealing after oxidation treatment has been carried out. It has been found that in this process, silicon oxides are formed along grain boundaries inside the surface layer of the steel sheets to cause a decrease in fatigue resistance. The reason for this decrease is probably because fatigue cracks develop starting from the oxides formed along the grain boundaries.

Extensive studies based on the above discussion resulted in the following findings. In the use of Si-containing high-strength steel sheets as base steel, oxidation of silicon on the outermost surface of the steel sheets causes a decrease in the wettability of the steel sheets with respect to molten zinc, and this oxidation is effectively prevented by performing reducing annealing after oxidation treatment has been carried out. In this process, a variation in $O_2$ concentration in the oxidation treatment atmosphere between the upstream stage and the downstream stage of the treatment makes it possible to prevent the picking up of iron oxides while ensuring a sufficient amount of iron oxides that is necessary to prevent the oxidation of silicon on the steel sheet surface. Regarding the high temperatures entailed in the alloying treatment of Si-containing steel, the alloying temperature can be decreased and enhancements in workability and fatigue resistance can be obtained by controlling appropriately the $H_2O$ concentration during the reducing annealing and specifying the alloying temperature based on the relationship thereof with the $H_2O$ concentration during the reducing annealing. To sum up, it has been found that high-strength galvannealed steel sheets having excellent workability and fatigue resistance can be obtained by performing the oxidation treatment under controlled $O_2$ concentrations and performing the alloying treatment at a temperature determined in accordance with the $H_2O$ concentration during the reducing annealing.

The disclosed embodiments are based on the findings discussed hereinabove and has the following characteristics.

[1] A method for producing high-strength galvannealed steel sheets including subjecting a steel sheet to an oxidation treatment, then to reducing annealing, thereafter to a hot-dip galvanizing treatment and to an alloying treatment, the steel sheet including, in mass %, C: not more than 0.3%, Si: 0.1 to 2.5% and Mn: 0.5 to 3.0%, the balance being Fe and inevitable impurities, the oxidation treatment including heating the steel sheet in an upstream stage at a temperature of 400 to 750° C. in an atmosphere having an $O_2$ concentration of not less than 1000 ppm by volume and a $H_2O$ concentration of not less than 1000 ppm by volume and heating the steel sheet in a downstream stage at a temperature of 600 to 850° C. in an atmosphere having an $O_2$ concentration of less than 1000 ppm by volume and a $H_2O$ concentration of not less than 1000 ppm by volume, the reducing annealing including heating the steel sheet at a temperature of 650 to 900° C. in an atmosphere containing 5 to 30 vol % of $H_2$ and 500 to 5000 ppm by volume of $H_2O$, the balance being $N_2$ and inevitable impurities, the alloying treatment including treating the steel sheet at a temperature T (° C.) satisfying the following relation for 10 to 60 seconds:

$$-50 \log([H_2O])+650 \leq T \leq -40 \log([H_2O])+680$$

wherein $[H_2O]$ represents the $H_2O$ concentration (ppm by volume) during the reducing annealing.

[2] The method for producing high-strength galvannealed steel sheets described in [1], wherein the oxidation treatment is performed in a direct-fired furnace (DFF) or a non-oxidation furnace (NOF), and the air ratio in the upstream stage is 1.0 to less than 1.3 and the air ratio in the downstream stage is 0.7 to less than 0.9.

[3] The method for producing high-strength galvannealed steel sheets described in [1] or [2], wherein during the reducing annealing, the difference in $H_2O$ concentration between at an upper portion and at a lower portion of a furnace is not more than 2000 ppm by volume.

[4] The method for producing high-strength galvannealed steel sheets described in any of [1] to [3], wherein the hot galvanizing treatment is performed in a hot galvanizing bath having a chemical composition including Al in an effective concentration of 0.095 to 0.115 mass %, the balance being Zn and inevitable impurities.

In the disclosed embodiments, the term "high-strength" means that the steel sheets have a tensile strength TS of 440 MPa or above. The base steels of high-strength galvanized steel sheets in the disclosed embodiments may be any of cold-rolled steel sheets and hot-rolled steel sheets.

Advantageous Effects

According to embodiments, high-strength galvannealed steel sheets having excellent workability and fatigue resistance can be obtained.

DETAILED DESCRIPTION

Figure 1:
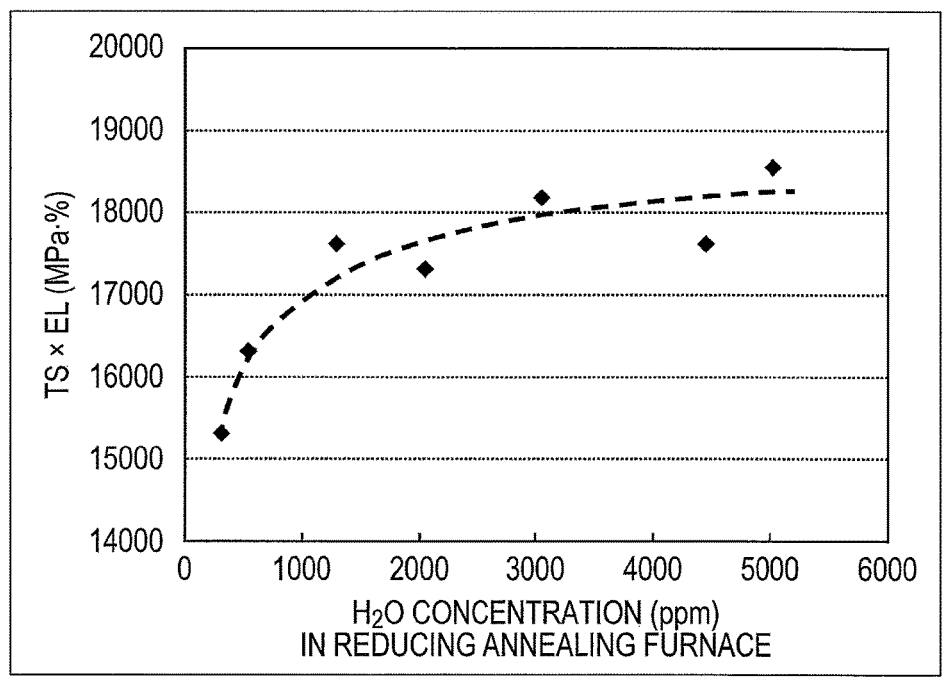
FIG. 1 is a diagram illustrating a relationship between the $H_2O$ concentration (ppm) in a reducing annealing furnace and the product (MPa·%) of the tensile strength TS multiplied by the elongation EL.

Hereinbelow, the disclosed embodiments will be described in detail.

In the following description, the contents of elements in the chemical composition of steel, and the contents of elements in the chemical composition of coating layers are all in "mass %" and are expressed simply with the unit "%" unless otherwise mentioned. Further, the $O_2$ concentration, the $H_2O$ concentration and the $H_2$ concentration are all in "vol %" or "ppm by volume" and are written simply with the unit "%" or "ppm", respectively, unless otherwise mentioned.

The chemical composition of steel will be described. C: not more than 0.3%

The C content is limited to not more than 0.3% because adding more than 0.3% carbon results in a decrease in weldability. On the other hand, the addition of carbon facilitates the enhancement in workability through the formation of steel microstructures such as retained austenite phase and martensite phase. Thus, the C content is preferably not less than 0.025%.

Si: 0.1 to 2.5%

Silicon is an element that is effective for obtaining good steel quality through the strengthening of steel. Any Si content less than 0.1% is not preferable from an economic viewpoint due to the need of expensive alloying elements for obtaining high strength. On the other hand, it is known that in Si-containing steels, the oxidation reaction during oxidation treatment is suppressed. If the Si content exceeds 2.5%, the formation of oxide films during the oxidation treatment is suppressed. Further, such excessive use of silicon causes the alloying temperature to be increased, making it difficult to obtain desired mechanical characteristics. Thus, the Si content is limited to 0.1% to 2.5%.

Mn: 0.5 to 3.0%

Manganese is an element effective for the strengthening of steel. In order to ensure mechanical characteristics and strength, 0.5% or more manganese is added. If, on the other hand, the Mn content exceeds 3.0%, it is sometimes difficult to ensure weldability, coating adhesion and the balance between strength and ductility. Thus, the Mn content is limited to 0.5% to 3.0%.

The balance is iron and inevitable impurities. As an inevitable impurity, the content of phosphorus is limited to not more than 0.03%. If the P content exceeds 0.03%, weldability is deteriorated at times. Further, the content of sulfur is limited to not more than 0.010%. If the S content exceeds 0.010%, weldability is deteriorated at times.

To control the balance between strength and ductility, the steel may optionally contain one or more elements selected from Al: 0.01 to 0.1%, Mo: 0.05 to 1.0%, Nb: 0.005 to 0.05%, Ti: 0.005 to 0.05%, Cu: 0.05 to 1.0%, Ni: 0.05 to 1.0%, Cr: 0.01 to 0.8% and B: 0.0005 to 0.005%.

The reasons why the appropriate contents of the above optional elements are limited will be described below.

Thermodynamically, aluminum is most liable to oxidation and is therefore oxidized prior to silicon and manganese to prevent the oxidation of silicon and manganese on the steel sheet surface and to promote the oxidation to occur inside the steel sheet. Such effects can be obtained when the Al content is not less than 0.01%. On the other hand, adding more than 0.1% aluminum results in an increase in costs. Thus, the Al content, when aluminum is added, is preferably not less than 0.01%, and the Al content, when aluminum is added, is preferably not more than 0.1%.

If the Mo content is less than 0.05%, it is difficult to obtain effects in the control of strength or, when molybdenum is added together with niobium, nickel and copper, in the enhancement in coating adhesion. On the other hand, adding more than 1.0% molybdenum results in an increase in costs. Thus, the Mo content, when molybdenum is added, is preferably not less than 0.05%, and the Mo content, when molybdenum is added, is preferably not more than 1.0%.

If the Nb content is less than 0.005%, it is difficult to obtain effects in the control of strength or, when niobium is added together with molybdenum, in the enhancement in coating adhesion. On the other hand, adding more than 0.05% niobium results in an increase in costs. Thus, the Nb content, when niobium is added, is preferably not less than 0.005%, and the Nb content, when niobium is added, is preferably not more than 0.05%.

If the Ti content is less than 0.005%, it is difficult to obtain effects in the control of strength. Adding more than 0.05% titanium results in a decrease in coating adhesion. Thus, the Ti content, when titanium is added, is preferably not less than 0.005%, and the Ti content, when titanium is added, is preferably not more than 0.05%.

If the Cu content is less than 0.05%, it is difficult to obtain effects in the facilitation of the formation of retained $\gamma$ phase or, when copper is added together with nickel and molybdenum, in the enhancement in coating adhesion. On the other hand, adding more than 1.0% copper results in an increase in costs. Thus, the Cu content, when copper is added, is preferably not less than 0.05%, and the Cu content, when copper is added, is preferably not more than 1.0%.

If the Ni content is less than 0.05%, it is difficult to obtain effects in the facilitation of the formation of retained $\gamma$ phase or, when nickel is added together with copper and molybdenum, in the enhancement in coating adhesion. On the other hand, adding more than 1.0% nickel results in an increase in costs. Thus, the Ni content, when nickel is added, is preferably not less than 0.05%, and the Ni content, when nickel is added, is preferably not more than 1.0%.

If the Cr content is less than 0.01%, it is difficult to obtain hardenability and the balance between strength and ductility is deteriorated at times. On the other hand, adding more than 0.8% chromium results in an increase in costs. Thus, the Cr content, when chromium is added, is preferably not less than 0.01%, and the Cr content, when chromium is added, is preferably not more than 0.8%.

Boron is an element that is effective for enhancing the hardenability of steel. If the B content is less than 0.0005%, it is difficult to obtain hardening effects. If the B content is above 0.005%, the coating adhesion is deteriorated due to the effect of boron in promoting the oxidation of silicon on the outermost surface of the steel sheet. Thus, the B content, when boron is added, is preferably not less than 0.0005%, and the B content, when boron is added, is preferably not more than 0.005%.

Next, the method for producing high-strength galvannealed steel sheets according to the disclosed embodiments will be described. In the disclosed embodiments, a steel sheet having the chemical composition described above is subjected to an oxidation treatment, subsequently to reducing annealing, thereafter to a hot-dip galvanizing treatment and then to an alloying treatment. In the oxidation treatment, the steel sheet is heated in the upstream stage at a temperature of 400 to 750° C. in an atmosphere having an $O_2$ concentration of not less than 1000 ppm and a $H_2O$ concentration of not less than 1000 ppm, and is heated in the downstream stage at a temperature of 600 to 850° C. in an atmosphere having an $O_2$ concentration of less than 1000 ppm and a $H_2O$ concentration of not less than 1000 ppm. In the reducing annealing, the steel sheet is heated at a temperature of 650 to 900° C. in an atmosphere having a $H_2$ concentration of 5 to 30% and a $H_2O$ concentration of 500 to 5000 ppm, the balance of the atmosphere being $N_2$ and inevitable impurities. In the alloying treatment, the steel sheet is treated at a temperature T satisfying the following relation for 10 to 60 seconds: $-50 \log([H_2O])+650 \leq T \leq -40 \log([H_2O])+680$.

In the above relation, $[H_2O]$ represents the $H_2O$ concentration (ppm) during the reducing annealing.

First, the oxidation treatment will be described. As already mentioned, the addition of such elements as silicon and manganese to steel is effective for increasing the strength of steel sheets. When, however, steel sheets containing these elements are subjected to an annealing process (oxidation treatment+reducing annealing) prior to hot galvanizing treatment, oxides of silicon and manganese are formed on the surface of the steel sheets to make it difficult to ensure coatability.

This problem has been studied. It has been then found that the coatability can be enhanced and further the reactivity between the hot melt and the steel sheet can be enhanced and consequently the coating adhesion is improved by controlling the conditions in the annealing (oxidation treatment+reducing annealing) performed prior to hot galvanizing treatment so that silicon and manganese will be oxidized inside the steel sheet and the oxidation of these elements on the steel sheet surface will be prevented.

It has been further found that performing the oxidation treatment first and thereafter the reducing annealing, the hot dipping and the alloying treatment is effective to ensure that silicon and manganese will be oxidized inside the steel sheet and the oxidation of these elements on the steel sheet surface will be prevented. Furthermore, it has been found necessary that the oxidation treatment produce at least a specific amount of iron oxides.

When, however, the reducing annealing is performed in the presence of at least a specific amount of iron oxides formed by the oxidation treatment, the pick-up problem is encountered. It is therefore important that the oxidation treatment be performed in separate upstream and downstream stages while controlling the $O_2$ concentration in the atmosphere in the respective stages. In particular, it is important to perform the downstream stage of the oxidation treatment at a lower $O_2$ concentration. Hereinbelow, the oxidation treatment in the upstream stage and the oxidation treatment in the downstream stage will be described.

[Upstream Stage of Treatment]

The oxidation treatment is performed positively in order to suppress the oxidation of silicon and manganese on the steel sheet surface and also to form iron oxides on the surface. In order to obtain a sufficient amount of iron oxides, the $O_2$ concentration needs to be 1000 ppm or above for this oxidation treatment. The upper limit of the concentration is not particularly specified. For economic reasons associated with oxygen introduction costs, the $O_2$ concentration is preferably not more than 20% that is the oxygen concentration in the air. Similarly to oxygen, $H_2O$ is effective for promoting the oxidation of iron and thus 1000 ppm or more water is used. The upper limit of the concentration is not particularly specified. For economic reasons associated with humidification costs, the concentration is preferably not more than 30%. To promote the oxidation of iron, it is necessary that the heating temperature be 400° C. or above. If, on the other hand, the heating temperature exceeds 750° C., iron is excessively oxidized to cause pick-ups in the next step. Thus, the heating temperature is limited to 400° C. to 750° C.

[Downstream Stage of Treatment]

The treatment in this stage is important in the disclosed embodiments in order to prevent the occurrence of pick-ups and to obtain a beautiful surface appearance without defects such as dents. To prevent pick-ups, it is important to chemically reduce a portion (the surface layer) of the surface of the steel sheet that has been oxidized. Controlling the $O_2$ concentration to less than 1000 ppm is necessary in order to perform such reduction treatment. At a lowered $O_2$ concentration, part of the surface layer of iron oxides is chemically reduced. Consequently, direct contact of the furnace rolls with the iron oxides during the reducing annealing in the next step can be avoided, and thus the occurrence of pick-ups can be prevented. This reducing reaction is hard to occur when the $O_2$ concentration is 1000 Ppm or above, and thus the $O_2$ concentration is limited to less than 1000 ppm. The $H_2O$ concentration is limited to not less than 1000 ppm in order to promote the internal oxidation of silicon and manganese described later. The upper limit thereof is not particularly specified. However, similarly to in the upstream stage of the oxidation treatment, the concentration is preferably not more than 30% for economic reasons associated with humidification costs. Heating at a temperature of less than 600° C. does not induce the reducing reaction efficiently. If the heating temperature is above 850° C., the effects are saturated and the heating costs are increased. Thus, the heating temperature is limited to 600° C. to 850° C.

To satisfy the conditions described above, it is necessary that the oxidation furnace be composed of at least two or more zones. In the oxidation furnace composed of two or more zones, the atmospheres in the respective zones are to be controlled in the manner described above. When the furnace is composed of three or more zones, the atmospheres in any adjacent zones may be controlled in the same manner to use such zones as one zone. Further, the upstream stage and the downstream stage may be performed in separate oxidation furnaces. In view of aspects such as industrial productivity and the implementation by a modification of the existing production line, it is preferable to divide a single furnace into two or more zones and to control the respective atmospheres.

Preferably, the upstream stage and the downstream stage of the oxidation treatment are performed with a direct-fired furnace (DFF) or a non-oxidation furnace (NOF). DFFs and NOFs are frequently used in hot galvanizing lines, and allow for easy control of the $O_2$ concentration through the controlling of the air ratio. Further, the use of DFF or NOF is preferable in terms of aspects such as production efficiency because the furnace can heat steel sheets at such a high rate that the furnace length of the heating furnace can be shortened or the line speed can be increased. In the upstream stage of the oxidation treatment, the atmosphere conditions described above may fall outside the aforementioned ranges if the air ratio is less than 1.0, and iron may be excessively oxidized if the air ratio is 1.3 or above. Thus, the air ratio is preferably 1.0 to less than 1.3. In the downstream stage of the oxidation treatment, the atmosphere conditions described above may fall outside the aforementioned ranges if the air ratio is 0.9 or above, and the ratio of the combustion gas used for heating is increased to cause an increase in costs if the air ratio is less than 0.7. Thus, the air ratio is preferably 0.7 to less than 0.9.

Next, the reducing annealing performed after the oxidation treatment will be described.

In the reducing annealing, the iron oxides that have been formed on the steel sheet surface during the oxidation treatment are reduced, and alloying elements such as silicon and manganese are formed into internal oxides inside the steel sheet with the oxygen supplied from the iron oxides. Consequently, a reduced iron layer is formed on the outermost surface of the steel sheet as a result of the reduction of the iron oxides, and silicon and manganese remain inside the steel sheet as internal oxides and are prevented from being oxidized on the steel sheet surface. In this manner, the steel sheet is prevented from a decrease in wettability with respect to hot melt, and can achieve good coating adhesion without the occurrence of bare spots.

Although good coating adhesion can be obtained in the above manner, the fact that the alloying involves a high temperature causes the decomposition of retained austenite phase into perlite phase and the temper softening of martensite phase, resulting in a failure to obtain desired mechanical characteristics. Approaches to decreasing the alloying temperature were then studied. As a result, a technique has been developed in which the internal oxidation of silicon is further activated to decrease the amount of solute silicon present in the surface layer of the steel sheet, thereby facilitating the alloying reaction. To further activate the formation of internal silicon oxide, it is effective to control the $H_2O$ concentration in the atmosphere in the reducing annealing furnace to 500 ppm or above, which is an important requirement in the disclosed embodiments. When the $H_2O$ concentration in the reducing annealing furnace is controlled to 500 ppm or above, the internal oxidation of silicon continuously takes place with oxygen supplied from $H_2O$ in the atmosphere even after internal silicon oxide is formed with oxygen supplied from the iron oxides. As a result, a larger amount of internal silicon oxide is formed. Then, the region of the surface layer of the steel sheet in which the internal oxide has been formed comes to contain a decreased amount of solute silicon. With a decreased amount of solute silicon, the surface layer of the steel sheet behaves like low-Si steel and the alloying reaction thereafter is facilitated and can proceed at a lower temperature. By virtue of the decrease in alloying temperature, the retained austenite phase can remain in a high fraction and the ductility is enhanced. Further, the temper softening of martensite phase does not occur, and desired strength can be obtained.

Steel sheets containing 0.13% carbon, 1.5% silicon and 2.6% manganese were subjected to the upstream stage of the oxidation treatment at a temperature of 650° C. in an atmosphere having an $O_2$ concentration of not less than 1000 ppm and a $H_2O$ concentration of not less than 1000 ppm, then to the downstream stage of the oxidation treatment at a temperature of 700° C. in an atmosphere having an $O_2$ concentration of less than 1000 ppm and a $H_2O$ concentration of not less than 1000 ppm, and to the reducing annealing at a $H_2$ concentration of 15% and a temperature of 830° C. while changing the $H_2O$ concentration in the reducing annealing furnace. Subsequently, the steel sheets were subjected to hot-dip galvanizing treatment and to alloying treatment at 480 to 560° C. for 25 seconds so that an appropriate alloying degree would be obtained. The galvannealed steel sheets obtained were tested to determine the tensile strength TS and the elongation EL (MPa·%), and the relationship was studied between the $H_2O$ concentration (ppm) in the reducing annealing furnace and the product (MPa·%) of the tensile strength TS multiplied by the elongation EL. FIG. 1 illustrates the relationship between the $H_2O$ concentration (ppm) in the reducing annealing furnace and the product (MPa·%) of the tensile strength TS multiplied by the elongation EL. From FIG. 1, it has been shown that the mechanical characteristic value expressed by TS×EL is markedly enhanced when the $H_2O$ concentration in the reducing annealing furnace is 500 ppm and above.

Figure 2:
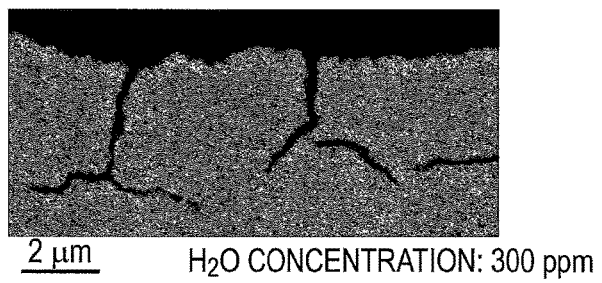
FIG. 2 is a set of SEM images illustrating cross-sections of surface layer portions of steel sheets.
Figure 2:
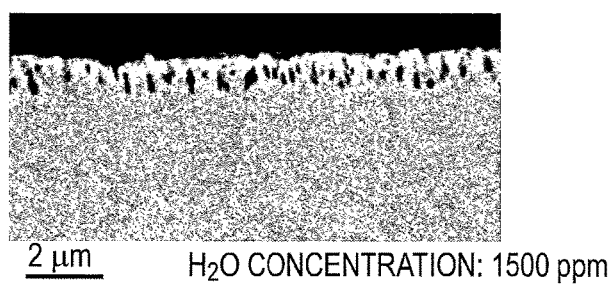

It has been further found that the fatigue resistance is also enhanced by controlling the $H_2O$ concentration in the reducing annealing furnace to 500 ppm or above. FIG. 2 is a set of SEM images showing observed cross sections of the surface layer portions of galvannealed steel sheets manufactured under the same conditions as the galvannealed steel sheets shown in FIG. 1 except that the $H_2O$ concentration in the reducing annealing furnace is changed to 300 ppm or 1500 ppm, the coating layers of the steel sheets being dissolved with hydrochloric acid after the alloying treatment. From FIG. 2, when the $H_2O$ concentration is 300 ppm, internal oxides are formed with oxygen supplied from iron oxides and in this case tend to be formed along grain boundaries inside the surface layer of the steel sheet. When, on the other hand, the $H_2O$ concentration is 1500 ppm, internal oxides are formed with oxygen supplied from $H_2O$ in the atmosphere and in this case tend to be formed uniformly within the grains inside the surface layer of the steel sheet. The reason for this difference is probably because the internal oxidation reaction based on oxygen supplied from iron oxides takes place at relatively low temperatures and therefore the oxygen tend to be diffused at a higher rate along the crystal grain boundaries than to the insides of the grains, whilst the internal oxidation reaction based on oxygen supplied from $H_2O$ in the atmosphere occurs at relatively high temperatures and therefore the difference between the rate of diffusion along the crystal grain boundaries and that to the insides of the grains is decreased and consequently the internal oxides are formed uniformly also within the grains. The internal oxides formed along the crystal grain boundaries cause a decrease in the strength of the grain boundaries, serve as starting points of cracks due to fatigue, and further facilitate the extension of cracks to cause poor fatigue resistance. In the case of the internal oxides formed uniformly within the crystal grains, excellent fatigue resistance is realized because stress concentrations are small even when cracks occur and the extension of cracks is prevented.

For the reasons described above, the $H_2O$ concentration in the reducing annealing furnace is limited to not less than 500 ppm. To further promote the internal oxidation within the grains, the concentration is preferably 1000 ppm or above. If, on the other hand, the $H_2O$ concentration exceeds 5000 ppm, the iron oxides formed in the oxidation furnace will be hard to reduced to give rise not only to a risk that pick-ups will occur in the reducing annealing furnace, but also to a risk of adhesive failure because the iron oxides remaining at the time of hot dipping cause a decrease in the wettability of the steel sheet with respect to molten zinc. Further, the use of such an excessively high $H_2O$ concentration leads to an increase in humidification costs. Thus, the upper limit of the $H_2O$ concentration is limited to 5000 ppm. In order to reduce the iron oxides completely, the $H_2O$ concentration is preferably not more than 4000 ppm.

The $H_2O$ concentration has a distribution in the reducing annealing furnace depending on the furnace structure, and generally tends to be higher at an upper portion of the furnace and to be lower at a lower portion of the furnace. In the case of a vertical furnace that is a mainstream furnace used in the hot galvanizing line, a large difference in $H_2O$ concentration between upper and lower portions of the furnace causes the steel sheet to pass through the high-concentration region and the low-concentration region alternately. Consequently, it becomes difficult to form internal oxides uniformly within the crystal grains. In order for a $H_2O$ concentration distribution to be as uniform as possible, it is preferable that the difference in $H_2O$ concentration between upper and lower portions of the furnace be not more than 2000 ppm. If the difference in $H_2O$ concentration between upper and lower portions exceeds 2000 ppm, the uniform formation of internal oxides is sometimes difficult. The $H_2O$ concentration in the lower region is low, and controlling this $H_2O$ concentration to fall in the range of H₂O concentrations in the disclosed embodiments entails the introduction of an excessively large amount of H₂O and thus increases the costs.

The H₂O concentration in the reducing annealing furnace may be controlled by any method without limitation. Examples of the methods include to introduce superheated steam into the furnace, and to introduce $N_2$ and/or $H_2$ gas humidified by bubbling or the like into the furnace. A membrane-exchange humidification method using a hollow fiber membrane is advantageous in that the dew point can be controlled more easily.

The $H_2$ concentration in the reducing annealing is limited to 5% to 30%. If the concentration is less than 5%, the reduction of iron oxides is suppressed and the risk of the occurrence of pick-ups is increased. Costs are increased if more than 306 hydrogen is used. After the deduction of 5 to 30% $H_2$ and 500 to 5000 ppm $H_2O$, the balance is $N_2$ and inevitable impurities.

The heating temperature is limited to 650° C. to 900° C. Heating at below 650° C. does not allow the iron oxides to be reduced efficiently, and also causes a failure to obtain desired mechanical characteristics. Obtaining desired mechanical characteristics also fails if the temperature exceeds 900° C. To achieve enhancements in mechanical characteristics, it is preferable that the steel sheet be held at a temperature of 650 to 900° C. for 10 to 600 seconds.

Next, the hot-dip galvanizing treatment and the alloying treatment will be described.

Figure 3:
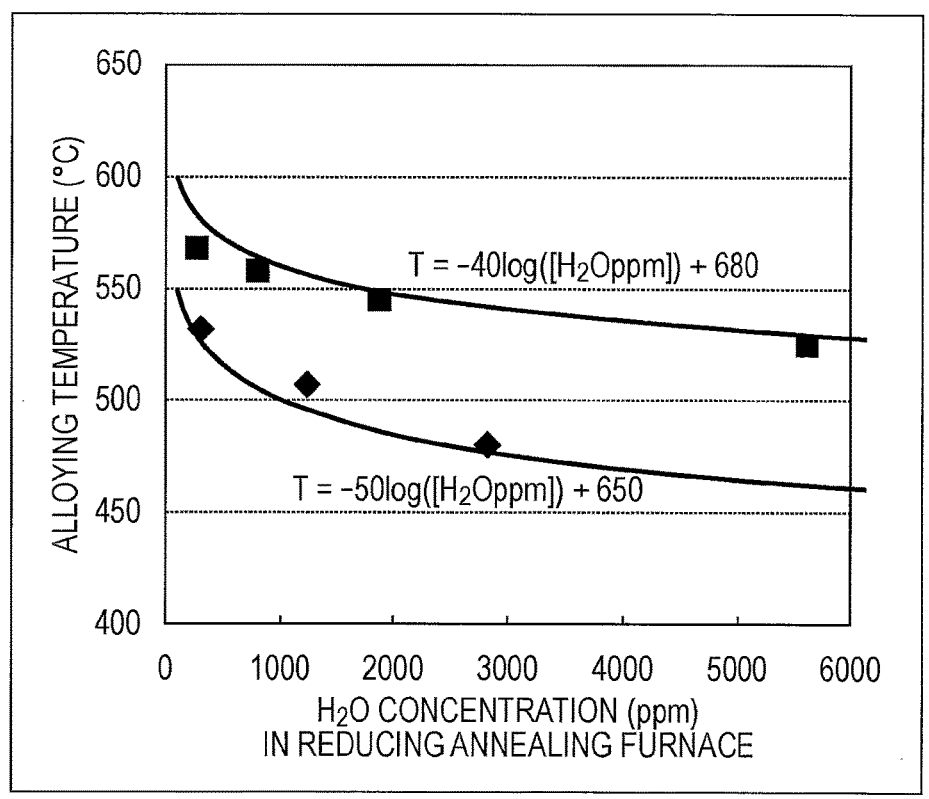
FIG. 3 is a diagram illustrating relationships between the change in $H_2O$ concentration in a reducing furnace and the alloying temperature.

As described hereinabove, it has been found that the alloying reaction is facilitated when internal silicon oxide is actively formed by performing the oxidation treatment and the reducing annealing under the controlled conditions. The galvannealed steel sheets used in FIG. 1 were then analyzed to study the relationships between the change in $H_2O$ concentration during the reducing annealing and the alloying temperature. The results obtained are shown in FIG. 3. In FIG. 3, the marks ♦ indicate temperatures at which the η phase formed before the alloying is completely converted into Fe—Zn alloy, namely, temperatures at which the alloying reaction has completed, and the marks ■ indicate the upper limits of temperatures up to which the coating adhesion is ranked 3 when evaluated by the method described in Examples later. The curves in the diagram represent the upper limit and the lower limit of the alloying temperature expressed by the specific relation described later.

From FIG. 3, the following findings have been obtained. If the alloying temperature is below $(-50 \log([H_2O])+650)°$ C., the alloying does not proceed completely and the η phase remains. The residual η phase not only gives rise to an uneven color tone on the surface and a consequent deterioration of surface appearance, but also increases the frictional coefficient of the coating surface and thus causes poor press formability. On the other hand, good coating adhesion cannot be obtained if the alloying temperature exceeds $(-40 \log([H_2O])+680)°$ C. Further, as shown in FIG. 3, the alloying temperature that is required decreases and the Fe—Zn alloying reaction is facilitated with increasing $H_2O$ concentration. The aforementioned enhancement in mechanical characteristic value in parallel with the increase in $H_2O$ concentration in the reducing annealing furnace is attributed to this lowering in alloying temperature. It has been thus shown that the temperature of the alloying after the hot-dipping should also be controlled accurately in order to obtain the desired mechanical characteristics.

Based on the above discussion, the alloying treatment is to be performed at a temperature T that satisfies the following relation:

$$-50 \log([H_2O])+650 \leq T \leq -40 \log([H_2O])+680$$

wherein [$H_2O$] represents the $H_2O$ concentration (ppm) during the reducing annealing.

For the similar reasons as in the discussion of the alloying temperature, the alloying time is limited to 10 to 60 seconds.

The above relation to be satisfied by the temperature T has been established under the condition of a $H_2$ concentration of 15 vol % during reducing annealing. As long as the $H_2$ concentration is 5 to 30 vol %, the temperature T is not affected by the $H_2$ concentration. Thus, surface appearance, press formability, coating adhesion and fatigue resistance can be enhanced by controlling the temperature T to satisfy the above relation under the condition that the $H_2$ concentration during the reducing annealing is 5 to 30 vol %.

The degree of alloying after the alloying treatment is not particularly limited. It is, however, preferable that the alloying degree be 7 to 15 mass %. If the alloying degree is less than 7 mass %, the η phase remains and causes a decrease in press formability. Poor coating adhesion is caused if the alloying degree is above 15 mass %.

Preferably, the hot galvanizing treatment is performed in a hot galvanizing bath which has a chemical composition including aluminum in an effective concentration of 0.095 to 0.115 mass % and the balance being zinc and inevitable impurities. Here, the effective concentration of aluminum in the bath is the difference obtained by subtracting the Fe concentration in the bath from the Al concentration in the bath. While Patent Literature 10 describes a technique that facilitates the alloying reaction by controlling the effective Al concentration in the bath to as low as 0.07 to 0.092%, the disclosed embodiments facilitate the alloying reaction without lowering the effective Al concentration in the bath. If the effective Al concentration in the bath is less than 0.095%, the alloying treatment results in the formation of F phase that is a hard and brittle Fe—Zn alloy at the interface between the steel sheet and the coating layer, thus leading to poor coating adhesion. If the effective concentration exceeds 0.115, the increase in alloying temperature cannot be avoided even by the application of the disclosed embodiments, and consequently the desired mechanical characteristics cannot be obtained at times.

Other hot galvanizing conditions are not particularly limited. For example, the temperature of the hot galvanizing bath may be in the usual range of 440 to 500° C., the steel sheet may be dipped into the bath at a sheet temperature of 440 to 550° C., and the coating mass may be controlled by gas wiping or the like.

EXAMPLES

Ingots of steels produced by melting having chemical compositions described in Table 1 were hot rolled, pickled and cold rolled to form cold-rolled steel sheets having a thickness of 1.2 mm.

TABLE 1

| Steel symbol | C | Si | Mn | P | (Mass %) S |
|---|---|---|---|---|---|
| A | 0.08 | 0.25 | 1.5 | 0.03 | 0.001 |
| B | 0.11 | 0.8 | 1.9 | 0.01 | 0.001 |
| C | 0.08 | 1.5 | 1.4 | 0.01 | 0.001 |
| D | 0.12 | 1.4 | 1.9 | 0.01 | 0.001 |
| E | 0.15 | 2.1 | 2.8 | 0.01 | 0.001 |
| F | 0.09 | 2.7 | 1.5 | 0.01 | 0.001 |
| G | 0.06 | 0.3 | 3.2 | 0.01 | 0.001 |

On a CGL having a DFF oxidation furnace or an NOF oxidation furnace, the steel sheets were subjected to the upstream and downstream stages of the oxidation treatment under the oxidation conditions described in Table 2, then to the reducing annealing under the conditions shown in Table 2. Subsequently, the resultant steel sheets were subjected to the hot galvanizing treatment using a 460° C. bath which contained aluminum in the effective concentration shown in Table 2, thereafter to gas wiping to control the basis weight to about 50 g/m², and to the alloying treatment at the temperature and for the time described in Table 2.

The galvannealed steel sheets obtained as described above were tested to evaluate the appearance and the coating adhesion. Further, tensile characteristics and the fatigue resistance were tested. The measurement methods and the evaluation methods are described below.

Appearance

The appearance after the alloying treatment was visually inspected for defects such as uneven alloying, bare spots and dents by picking-up. The appearance was evaluated as ○ when such defects were absent, as Δ when the appearance had slight defects but was generally acceptable, and as x when uneven alloying, bare spots or dents were present.

Coating Adhesion

CELLOPHANE TAPE (registered trademark) was applied to each of the coated steel sheets. The surface covered with the tape was bent 90° and was returned back. A 24 mm wide piece of CELLOPHANE TAPE was pressed against the inward side (the compressed side) of the worked portion in parallel with the bent portion and was peeled therefrom. The amount of zinc attached over a 40 mm long portion of CELLOPHANE TAPE was measured in terms of the number of Zn counts by fluorescent X-ray analysis. The number of Zn counts per unit length (1 m) was evaluated based on the following criteria. Those ranked as 1 and 2 were evaluated as excellent (○), those ranked as 3 were evaluated as good (Δ), and those ranked as 4 and above were evaluated as poor (x).

| Number of fluorescent X-ray counts | Ranks |
| --- | --- |
| 0-less than 500 | 1 (Excellent) |
| 500-less than 1000 | 2 |
| 1000-less than 2000 | 3 |
| 2000-less than 3000 | 4 |
| 3000- | 5 (Poor) |

Tensile Characteristics

JIS No. 5 test pieces were tested in accordance with JIS Z2241: 2011 with respect to the rolling direction as the tensile direction.

Fatigue Resistance

The fatigue limit (FL) was determined by subjecting the steel sheets to repeated stresses $10^7$ times with a stress ratio R of 0.05, and the endurance ratio (FL/TS) was obtained. The fatigue resistance was evaluated as good when the ratio was 0.60 or above. The stress ratio R is a value defined by (minimum stress of repeated stresses)/(maximum stress of repeated stresses).

The results obtained by the above evaluations, and the production conditions are described in Table 2.

TABLE 2

| | | Oxidation treatment | | | | | | Reducing annealing | | | |
| | | Upstream stage | | | Downstream stage | | | | treatment | | |
| No. | Steel symbol | Oxygen conc. (ppm) | H₂O conc. (ppm) | Heating temp. (° C.) | Oxygen conc. (ppm) | H₂O conc. (ppm) | Heating temp. (° C.) | Furnace | H₂ conc. (%) | H₂O conc. at upper portion (ppm) | H₂O conc. at lower portion (ppm) | Difference in H₂O conc. (ppm) |
| --- | --- | --- | --- | --- | --- | --- | --- | --- | --- | --- | --- | --- |
| 1 | C | 20000 | 20000 | 650 | 500 | 20000 | 700 | DFF | 15 | 2800 | 1500 | 1300 |
| 2 | C | 20000 | 20000 | 650 | 500 | 20000 | 700 | DFF | 15 | 3800 | 2800 | 1000 |
| 3 | C | 20000 | 20000 | 650 | 400 | 20000 | 700 | DFF | 15 | 2500 | 600 | 1900 |
| 4 | C | 18000 | 20000 | 650 | 300 | 20000 | 700 | DFF | 15 | 4800 | 3700 | 1100 |
| 5 | C | 20000 | 20000 | 650 | 500 | 20000 | 700 | DFF | 15 | 2500 | 2300 | 200 |
| 6 | C | 20000 | 20000 | 650 | 200 | 20000 | 700 | DFF | 15 | 450 | 200 | 250 |
| 7 | C | 20000 | 20000 | 650 | 500 | 20000 | 700 | DFF | 15 | 6500 | 5100 | 1400 |
| 8 | C | 15000 | 20000 | 620 | 500 | 20000 | 680 | DFF | 15 | 3800 | 1200 | 2600 |
| 9 | C | 20000 | 20000 | 570 | 600 | 20000 | 630 | DFF | 25 | 3800 | 2800 | 1000 |
| 10 | C | 20000 | 20000 | 650 | 500 | 20000 | 700 | DFF | 3 | 2800 | 1500 | 1300 |
| 11 | C | 22000 | 20000 | 550 | 500 | 20000 | 590 | NOF | 15 | 2500 | 1400 | 1100 |
| 12 | C | 20000 | 20000 | 680 | 500 | 20000 | 720 | NOF | 15 | 3500 | 2500 | 1000 |
| 13 | C | 20000 | 20000 | 650 | 2000 | 20000 | 700 | DFF | 15 | 3200 | 2600 | 600 |
| 14 | D | 10000 | 20000 | 650 | 500 | 20000 | 700 | DFF | 15 | 1500 | 800 | 700 |
| 15 | D | 5000 | 20000 | 650 | 500 | 20000 | 700 | DFF | 15 | 1800 | 1300 | 500 |
| 16 | D | 2000 | 20000 | 650 | 800 | 20000 | 700 | DFF | 15 | 3800 | 2900 | 900 |
| 17 | D | 500 | 20000 | 650 | 500 | 20000 | 700 | DFF | 15 | 2900 | 2000 | 900 |
| 18 | D | 20000 | 500 | 650 | 500 | 20000 | 700 | DFF | 15 | 4000 | 2700 | 1300 |
| 19 | D | 20000 | 20000 | 650 | 900 | 500 | 700 | DFF | 15 | 1800 | 1600 | 200 |
| 20 | D | 20000 | 20000 | 500 | 500 | 20000 | 550 | DFF | 15 | 3200 | 2900 | 300 |
| 21 | D | 25000 | 20000 | 350 | 500 | 20000 | 450 | DFF | 15 | 2400 | 1800 | 600 |
| 22 | D | 20000 | 20000 | 770 | 500 | 20000 | 820 | DFF | 15 | 2900 | 2700 | 200 |
| 23 | D | 20000 | 20000 | 650 | 500 | 20000 | 700 | DFF | 15 | 1800 | 1500 | 300 |
| 24 | D | 20000 | 20000 | 680 | 400 | 20000 | 710 | DFF | 15 | 2800 | 1500 | 1300 |
| 25 | D | 19000 | 20000 | 680 | 500 | 20000 | 710 | DFF | 15 | 3800 | 2800 | 1000 |
| 26 | D | 20000 | 20000 | 680 | 700 | 20000 | 710 | DFF | 15 | 2500 | 2300 | 200 |
| 27 | F | 20000 | 20000 | 650 | 500 | 20000 | 700 | DFF | 15 | 4000 | 3100 | 900 |
| 28 | G | 20000 | 20000 | 650 | 400 | 20000 | 700 | DFF | 15 | 3800 | 2800 | 1000 |
| 29 | A | 20000 | 20000 | 650 | 500 | 20000 | 700 | DFF | 15 | 1800 | 1400 | 400 |
| 30 | B | 1200 | 20000 | 650 | 500 | 20000 | 700 | DFF | 15 | 3500 | 2100 | 1400 |
| 31 | E | 20000 | 20000 | 650 | 300 | 20000 | 700 | DFF | 15 | 3800 | 2800 | 1000 |
| 32 | E | 20000 | 20000 | 730 | 500 | 20000 | 770 | DFF | 15 | 2500 | 2100 | 400 |

TABLE 2-continued

| No. | Reducing annealing treatment Ave. H₂O conc. (ppm) | Reducing annealing treatment Heating temp. (° C.) | Hot dipping Effective Al conc. (%) | Alloying treatment Alloying temp. (° C.) | Alloying treatment Alloying time (sec) | Coating appearance | Coating adhesion | T S (MPa) | E L (%) | Tensile fatigue limit (MPa) | Endurance ratio | |
|---|---|---|---|---|---|---|---|---|---|---|---|---|
| 1 | 2150 | 810 | 0.102 | 510 | 30 | ○ | ○ | 612 | 33 | 430 | 0.70 | Example |
| 2 | 3300 | 830 | 0.105 | 480 | 28 | ○ | ○ | 623 | 32 | 450 | 0.72 | Example |
| 3 | 1550 | 790 | 0.105 | 540 | 29 | ○ | ○ | 598 | 28 | 380 | 0.64 | Example |
| 4 | 4250 | 810 | 0.105 | 480 | 30 | Δ | ○ | 622 | 31 | 450 | 0.72 | Example |
| 5 | 2400 | 810 | 0.106 | 510 | 30 | ○ | ○ | 618 | 31 | 450 | 0.73 | Example |
| 6 | 325 | 830 | 0.101 | 590 | 30 | ○ | ○ | 585 | 27 | 330 | 0.56 | Comp. Ex. |
| 7 | 5800 | 750 | 0.101 | 470 | 32 | X | X | 635 | 33 | 500 | 0.79 | Comp. Ex. |
| 8 | 2500 | 700 | 0.098 | 510 | 36 | ○ | ○ | 630 | 29 | 430 | 0.68 | Example |
| 9 | 3300 | 650 | 0.097 | 500 | 33 | ○ | ○ | 650 | 27 | 480 | 0.74 | Example |
| 10 | 2150 | 830 | 0.103 | 520 | 45 | X | X | 614 | 31 | 450 | 0.73 | Comp. Ex. |
| 11 | 1950 | 600 | 0.102 | 530 | 30 | X | X | 678 | 21 | 500 | 0.74 | Comp. Ex. |
| 12 | 3000 | 850 | 0.102 | 500 | 24 | ○ | ○ | 599 | 33 | 480 | 0.80 | Example |
| 13 | 2900 | 840 | 0.102 | 500 | 30 | X | ○ | 607 | 31 | 450 | 0.74 | Comp. Ex. |
| 14 | 1150 | 810 | 0.103 | 550 | 25 | ○ | ○ | 799 | 22 | 500 | 0.63 | Example |
| 15 | 1550 | 800 | 0.105 | 540 | 29 | ○ | ○ | 812 | 23 | 600 | 0.74 | Example |
| 16 | 3350 | 780 | 0.111 | 500 | 26 | ○ | ○ | 823 | 24 | 630 | 0.77 | Example |
| 17 | 2450 | 830 | 0.111 | 560 | 34 | X | X | 755 | 22 | 550 | 0.73 | Comp. Ex. |
| 18 | 3350 | 770 | 0.111 | 550 | 30 | ○ | X | 763 | 21 | 550 | 0.72 | Comp. Ex. |
| 19 | 1700 | 750 | 0.108 | 540 | 30 | ○ | ○ | 803 | 24 | 450 | 0.56 | Comp. Ex. |
| 20 | 3050 | 780 | 0.107 | 540 | 44 | X | ○ | 815 | 23 | 600 | 0.74 | Comp. Ex. |
| 21 | 2100 | 770 | 0.105 | 560 | 38 | X | ○ | 778 | 21 | 550 | 0.71 | Comp. Ex. |
| 22 | 2800 | 850 | 0.103 | 490 | 28 | X | ○ | 821 | 25 | 580 | 0.71 | Comp. Ex. |
| 23 | 1650 | 810 | 0.111 | 560 | 5 | X | ○ | 795 | 21 | 550 | 0.69 | Comp. Ex. |
| 24 | 2150 | 830 | 0.096 | 490 | 80 | ○ | X | 795 | 22 | 550 | 0.69 | Comp. Ex. |
| 25 | 3300 | 830 | 0.090 | 480 | 22 | ○ | Δ | 854 | 24 | 600 | 0.70 | Example |
| 26 | 2400 | 830 | 0.118 | 540 | 55 | ○ | Δ | 793 | 23 | 550 | 0.69 | Example |
| 27 | 3550 | 810 | 0.102 | 560 | 20 | X | X | 1028 | 17 | 700 | 0.68 | Comp. Ex. |
| 28 | 3300 | 820 | 0.102 | 510 | 31 | X | X | 1234 | 12 | 800 | 0.65 | Comp. Ex. |
| 29 | 1600 | 800 | 0.103 | 500 | 26 | ○ | ○ | 628 | 26 | 450 | 0.72 | Example |
| 30 | 2800 | 780 | 0.105 | 500 | 35 | ○ | ○ | 825 | 22 | 630 | 0.76 | Example |
| 31 | 3300 | 830 | 0.106 | 520 | 30 | ○ | ○ | 1263 | 14 | 800 | 0.63 | Example |
| 32 | 2300 | 870 | 0.100 | 530 | 50 | ○ | ○ | 1221 | 15 | 800 | 0.66 | Example |

From Table 2, the high-strength steels of the Examples according to disclosed embodiments achieved excellent coating adhesion, good coating appearance, excellent ductility and good fatigue resistance in spite of their containing silicon and manganese. In contrast, the steels of Comparative Examples manufactured under conditions outside the range of the disclosed embodiments were unsatisfactory in one or more of coating adhesion, coating appearance and fatigue resistance.

INDUSTRIAL APPLICABILITY

The high-strength galvanized steel sheets according to the disclosed embodiments exhibit excellent coating adhesion and fatigue resistance, and can be used as surface-treated steel sheets for realizing lightweight and strong automobile bodies.

The invention claimed is:

1. A method for producing high-strength galvannealed steel sheets, the method comprising:
    subjecting a steel sheet to an oxidation treatment, the steel sheet comprising C: not more than 0.3%, by mass %, Si: 0.1 to 2.5%, by mass %, Mn: 0.5 to 3.0%, by mass %, and Fe and incidental impurities, the oxidation treatment including heating the steel sheet in (i) an upstream stage at a temperature in the range of 400° C. to 750° C. in an atmosphere having an O₂ concentration of not less than 1000 ppm by volume and a H₂O concentration of not less than 1000 ppm by volume and (ii) a downstream stage at a temperature in the range of 600° C. to 850° C. in an atmosphere having an O₂ concentration of less than 1000 ppm by volume and a H₂O concentration of not less than 1000 ppm by volume;
    then subjecting the steel sheet to reducing annealing, the reducing annealing including heating the steel sheet at a temperature in the range of 650° C. to 900° C. in an atmosphere containing 5% to 30% of H₂, by vol %, 500 ppm to 5000 ppm of H₂O, by volume, and a balance of N₂ and incidental impurities; and
    thereafter subjecting the steel sheet to a hot-dip galvanizing treatment and to an alloying treatment, the alloying treatment including treating the steel sheet at a temperature T (° C.) satisfying the following relationship for 10 to 60 seconds:

$$-50\ \log([H_2O])+650 \leq T \leq -40\ \log([H_2O])+680$$

where [H₂O] represents the H₂O concentration by volume ppm during the reducing annealing.

2. The method for producing high-strength galvannealed steel sheets according to claim 1, wherein the oxidation treatment is performed in a furnace,
    the air ratio in the upstream stage is in the range of 1.0 to less than 1.3 and the air ratio in the downstream stage is in the range of 0.7 to less than 0.9, and
    the furnace is a direct-fired furnace or a non-oxidation furnace.

3. The method for producing high-strength galvannealed steel sheets according to claim 1, wherein during the reducing annealing, the difference in H₂O concentration between an upper portion of a furnace and a lower portion of the furnace is not more than 2000 ppm, by volume.

4. The method for producing high-strength galvannealed steel sheets according to claim 1, wherein the hot-dip galvanizing treatment is performed in a hot galvanizing bath having a chemical composition including Al in a concentration in the range of 0.095 to 0.115, by mass %, and a balance of Zn and inevitable impurities.

5. The method for producing high-strength galvannealed steel sheets according to claim 2, wherein during the reducing annealing, the difference in $H_2O$ concentration between an upper portion of the furnace and a lower portion of the furnace is not more than 2000 ppm, by volume.

6. The method for producing high-strength galvannealed steel sheets according to claim 2, wherein the hot-dip galvanizing treatment is performed in a hot galvanizing bath having a chemical composition including Al in a concentration in the range of 0.095 to 0.115, by mass %, and a balance of Zn and inevitable impurities.

7. The method for producing high-strength galvannealed steel sheets according to claim 3, wherein the hot-dip galvanizing treatment is performed in a hot galvanizing bath having a chemical composition including Al in a concentration in the range of 0.095 to 0.115, by mass %, and a balance of Zn and inevitable impurities.

8. The method for producing high-strength galvannealed steel sheets according to claim 5, wherein the hot-dip galvanizing treatment is performed in a hot galvanizing bath having a chemical composition including Al in a concentration in the range of 0.095 to 0.115, by mass %, and a balance of Zn and inevitable impurities.

9. The method for producing high-strength galvannealed steel sheets according to claim 1, wherein the steel sheet further comprises at least one selected from the group consisting of Al: 0.01 to 0.1%, by mass %, Mo: 0.05 to 1.0%, by mass %, Nb: 0.005 to 0.05%, by mass %, Ti: 0.005 to 0.05%, by mass %, Cu: 0.05 to 1.0%, by mass %, Ni: 0.05 to 1.0%, by mass %, Cr: 0.01 to 0.8%, by mass %, and B: 0.0005 to 0.005%, by mass %.

* * * * *